(12) United States Patent
Walton et al.

(10) Patent No.: US 9,127,166 B2
(45) Date of Patent: Sep. 8, 2015

(54) CALCIUM SULPHATE-BASED PRODUCTS HAVING ENHANCED WATER RESISTANCE

(75) Inventors: Richard Ian Walton, Dadlington (GB); Robin Fisher, Loughborough (GB)

(73) Assignee: BPB Limited, Coventry (GB)

( * ) Notice: Subject to any disclaimer, the term of this patent is extended or adjusted under 35 U.S.C. 154(b) by 524 days.

(21) Appl. No.: 13/322,016

(22) PCT Filed: May 24, 2010

(86) PCT No.: PCT/GB2010/050848
§ 371 (c)(1),
(2), (4) Date: Feb. 4, 2013

(87) PCT Pub. No.: WO2010/133898
PCT Pub. Date: Nov. 25, 2010

(65) Prior Publication Data
US 2013/0269571 A1   Oct. 17, 2013

(30) Foreign Application Priority Data
May 22, 2009 (GB) .................................. 0908809.7

(51) Int. Cl.
*C04B 41/50* (2006.01)
*C09C 1/02* (2006.01)
(Continued)

(52) U.S. Cl.
CPC ................. *C09C 1/025* (2013.01); *C04B 28/16* (2013.01); *C04B 28/346* (2013.01); *C04B 41/5015* (2013.01); *C04B 2111/27* (2013.01)

(58) Field of Classification Search
CPC .. C04B 28/16; C04B 28/346; C04B 41/5015; C04B 2111/27; C09C 1/025

USPC ...................... 106/680, 690, 772, 775, 286.6; 427/372.2
See application file for complete search history.

(56) References Cited

U.S. PATENT DOCUMENTS 5,958,131 A   9/1999 Asbridge et al.
6,197,107 B1   3/2001 Stav et al.
(Continued)

FOREIGN PATENT DOCUMENTS

DE   3923934 A1   1/1991
FR   2868772 A   10/2005
(Continued)

OTHER PUBLICATIONS

Cesniene, Jurate, Influence of Phosphatic Impurities on the Anhydrite Binding Material of Phosphogypsum, Ceramics—Silikáty 51 (3) 153-159 (2007).
(Continued)

*Primary Examiner* — Melvin C Mayes
*Assistant Examiner* — James Corno
(74) *Attorney, Agent, or Firm* — GrayRobinson P.A.; Michael J. Colitz, III

(57) ABSTRACT

A water-resistant calcium sulphate based body comprises a matrix of crystalline calcium sulphate anhydrite, crystals of the matrix being connected to one another by water-resistant phosphate bonding zones, optionally also containing aluminum. The body can be produced by impregnating a porous calcium sulphate with a source of phosphate ions (optionally containing aluminum), and then calcining. Alternatively, a paste comprising calcium sulphate and a source of phosphate ions (optionally containing aluminum) is heated or compressed to form a 'green body' and then calcined to produce the body.

9 Claims, 4 Drawing Sheets

(51) Int. Cl.
*C04B 28/14* (2006.01)
*C04B 111/27* (2006.01)
*C04B 28/16* (2006.01)
*C04B 28/34* (2006.01)

(56) References Cited

U.S. PATENT DOCUMENTS

| | | | |
|---|---|---|---|
| 6,342,284 | B1 | 1/2002 | Yu et al. |
| 2003/0100648 | A1* | 5/2003 | Yu et al. ............... 524/416 |
| 2004/0151751 | A1 | 8/2004 | Cooper |

FOREIGN PATENT DOCUMENTS

| | | |
|---|---|---|
| FR | 2892116 A | 4/2007 |
| GB | PCT/GB2010/050848 | 5/2010 |
| JP | 52114495 A | 9/1977 |
| JP | 53003425 A | 1/1978 |
| JP | 56169161 A | 5/1980 |
| JP | 4016537 A | 1/1992 |
| WO | 0006518 A1 | 2/2000 |
| WO | 2006072126 A | 7/2006 |
| WO | 2006134670 A | 12/2006 |
| WO | 2009075598 A | 6/2009 |

OTHER PUBLICATIONS

Singh, Manjit et al., Study on Anhydrite Plaster from Waste Phosphogypsum for Use in Polymerised Flooring Composition, Construction and Building Materials 19 (2005) 25-29.

Hong et al., Development of Cr-Free Aluminum Phosphate Binders and Their Composite Applications, Composite Science and Technology, 2007, vol. 67, Part.6, pp. 1195-1201.

Kovler, Enhancing Water Resistance of Cement and Gypsum-Cement Materials, Journal of Materials in Civil Engineering, 2001, vol. 13, Pt.5, pp. 349-355.

* cited by examiner 2500 x Magnification 1000 x Magnification 10,000 x Magnification

Scheme 1

Scheme 2

Scheme 3

CALCIUM SULPHATE-BASED PRODUCTS HAVING ENHANCED WATER RESISTANCE

The present invention relates to calcium-sulphate based products having enhanced water resistance, and methods for the production thereof.

Gypsum (that is, calcium sulphate dihydrate) is not currently considered to be a material that can be used in external environments or in other applications where sustained water contact is possible. This is because of gypsum's solubility and the lack of chemical bonding between crystals in the polycrystalline matrix.

There is a continuing need for water-resistant bodies based on calcium sulphate having improved compressive strength after prolonged contact with water.

According to the present invention therefore, there is provided a water-resistant calcium sulphate-based body, which comprises a polycrystalline matrix of calcium sulphate anhydrite, crystals of which matrix are connected to one another by water-resistant phosphate bonding zones. The matrix and the bonding zones are continuous (that is, substantially free of discontinuities or pores), like a ceramic, rather than discontinuous (a discontinuous matrix would be more like conventional rehydrated gypsum). The bonding zones are substantially water-insensitive and contain phosphate in the form of a polyphosphate.

It is particularly preferred that the bonding zones consist essentially of non-crystalline phosphate, or comprise anhydrous aluminophosphate, as will be described in more detail in the following description.

Phosphoric acid and phosphates are known for use in calcium sulphate formulations, for example, from JP52114495 (Onada Cement Co Ltd). JP4016537 (Dai-ichi Cement Co Ltd) and WO2006/134670, but not for the purpose of providing bonding zones and consequent water-resistance.

The calcium sulphate anhydrite matrix used according to the invention is preferably substantially free of calcium sulphate hemihydrates.

The body according to the invention may also have greater hardness, fire resistance, lower solubility and greater wet strength than conventional gypsum products.

The body according to the invention is preferably substantially cement-free, as cement is not needed to bond the matrix together. As indicated, that function is performed by the phosphate bonding zones present in the body according to the invention.

The present invention further comprises a method of producing a water-resistant calcium sulphate body, in which a porous calcium sulphate body is impregnated with phosphate ions and calcined to produce a body comprising porous crystalline calcium sulphate anhydrite bonded by water-resistant phosphate.

The porous calcium sulphate to be calcined may be, for example, in the form of substantially dry porous calcium sulphate material (such as an anhydrite or hydrate) impregnated with a source of phosphate ions.

The substantially dry porous calcium sulphate may, for example, be formed from a paste of the calcium sulphate impregnated with the source of phosphate ions, which is compressed to form a green body before firing.

Alternatively, the water-resistant gypsum-based body may be produced by a method in which a paste comprising calcium sulphate and a source of phosphate ions is heated or compressed to form a 'green body' and then calcined to produce a body comprising porous crystalline calcium sulphate anhydrite bonded by water-resistant phosphate. If the starting material is calcium sulphate anhydrite, then compression is needed to form the green body as there is no phase change with heat.

The calcining, either of the green body impregnated with phosphate ions or of the body to be subsequently impregnated with phosphate ions, may be carried out at a temperature of at least 400° C., more preferably at least 500° C., but preferably not more than 600° C. The calcining should be such that the resulting body is substantially free of calcium sulphate hemihydrates, which would otherwise adversely affect performance.

It is particularly preferred according to the invention that the green body should be impregnated with phosphate ions before compression of the green body and calcining of the pressed body, as this can result in a body having a water uptake of less than 5% by weight, making it suitable for external and load bearing applications. In either variant of the method according to the invention, it is preferred that the phosphate ions are employed in an amount of 20 to 50 mol % based on the amount of the calcium sulphate.

Phosphoric acid (that is, orthophosphoric acid of formula $H_3PO_4$) is a preferred source of phosphate ions; other such sources include pyrophosphoric acid (of formula $H_4P_2O_7$) and salts of such acids, which preferably retain free acid groups. Any cations present in the source of phosphate ions should be either non-deleterious or (preferably) advantageous to desired properties of the resulting body.

It is particularly preferred that the source of phosphate ions further contains, as such advantageous ions, aluminium-containing ions, in which case the bonding zones comprise aluminophosphate as described above. Aluminium-containing ions may, for example, be provided as aluminium orthophosphate.

Aluminophosphate binders have been described in, for example, L-Y Hong et al "Development of Cr-free aluminium phosphate binders and their composite applications"—Composite Science and Technology, 67 (2007) pp 1195-1201. That article has no disclosure or suggestion of aluminophosphate binders for use in calcium sulphate-based bodies.

Exemplary non-deleterious cations for use in the method according to the invention include sodium, typically provided as the mono- or di-sodium orthophosphate.

Dry porous calcium sulphate anhydrite may be impregnated according to the invention with the source of phosphate ions and then dried. Alternatively, the dry porous calcium sulphate anhydrite may produced by drying and calcining wet porous gypsum obtained by mixing plaster with water containing the source of phosphate ions.

When dry porous gypsum is employed, it may be produced by drying wet porous gypsum obtained by mixing plaster with water.

In a preferred embodiment of the method according to the invention, porous calcium sulphate anhydrite to be calcined may be in the form of a wet porous "green" body produced by heating of a preformed mix of gypsum treated with a source of phosphate ions, typically in a sealed container or autoclave. Such a mix may include waste streams of gypsum which already contain phosphate ions.

When calcium sulphate anhydrite is used in the method according to the invention, it may, for example, be anhydrite II or anhydrite III. When anhydrite II is used it may be employed in Schemes 1 and 3 as shown in FIG. 7 of the accompanying drawings while when anhydrite III is used it may be employed in Scheme 2 as shown in FIG. 7 of the accompanying drawings.

The body according to the invention may contain further additives generally of a type known for use in gypsum, such as fillers (for example, silica) or catalysts.

The body according to the invention is preferably a set plaster body, such as a shaped article, a block or a board. When the body is a shaped article, it may, for example, be one for use in a biological environment (that is the body may be a bioceramic). When the body is a block, it may for example be in the form of a brick, tile, or other load-bearing element suitable for external use.

When the body is a board, such as gypsum board, it may be either with, or without, surface reinforcement or liner sheets; when surface reinforcement is used for the board, the latter may, for example, be of fibre scrim (for example, of glass fibre) or fibre mesh. A board according to the invention may be load bearing and may be suitable for external use.

Other non-deleterious materials, adjuvants and ingredients may, when appropriate, be present in the gypsum bodies according to the invention. Examples of such non-deleterious materials include optional further ingredients, such as cross-linking agents, hydrophobic agents (such as silicones or reactive silanes), starch, reinforcing fibres, set accelerators and retarders, superplasticisers, deformation inhibitors (such as anti-sagging agents), anti-shrink additives, recalcination inhibitors, foam stabilisers, bactericides, fungicides, pH adjusters, colouring agents, fire retardants and fillers (such as particulate mineral material or plastics, which may in some embodiments be in expanded form).

Certain advantages and features of the present invention are illustrated, by way of example only, with reference to the accompanying drawings, in which.

Figure 5:
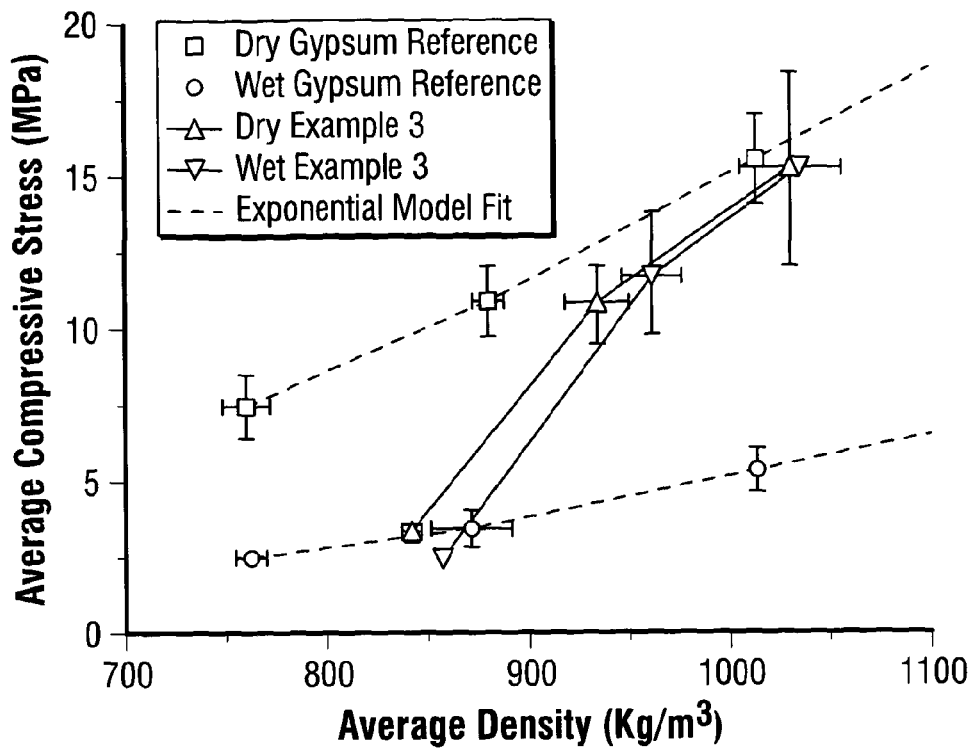
Figure 6:
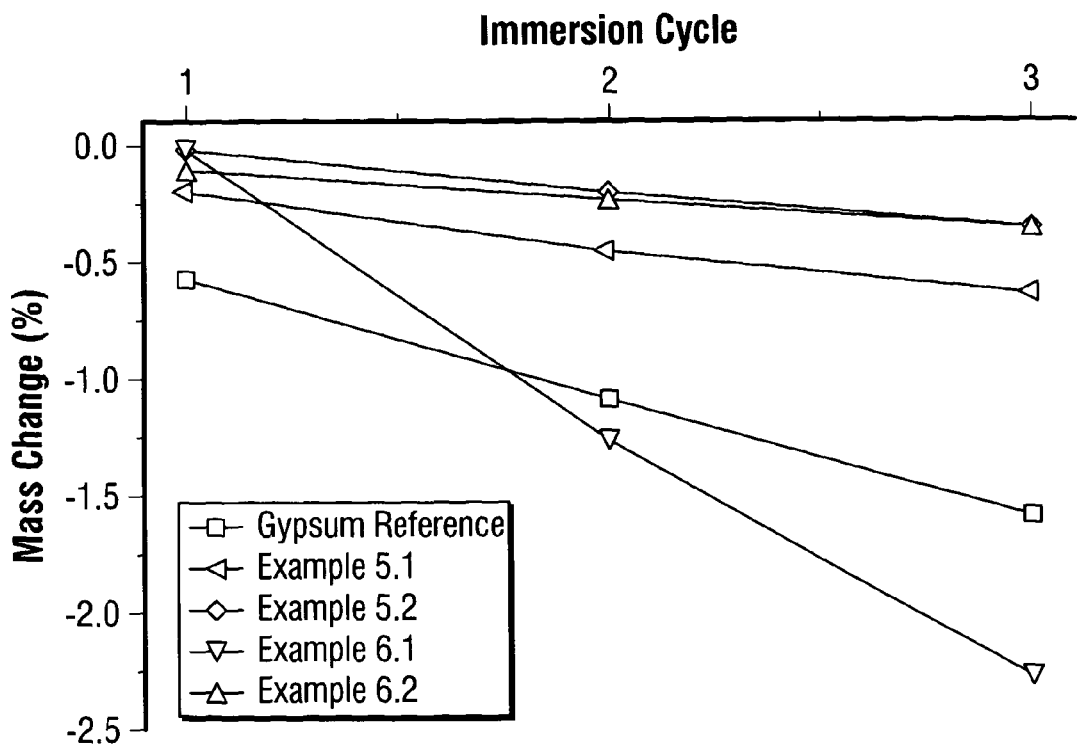
Figure 7:
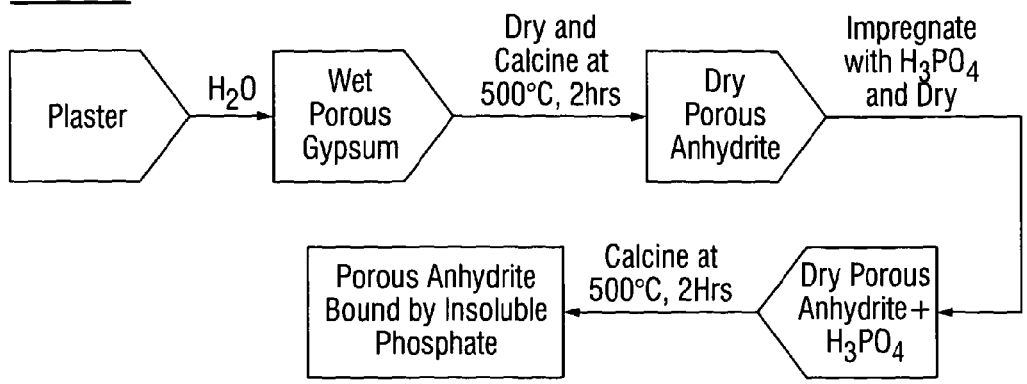
Figure 7:
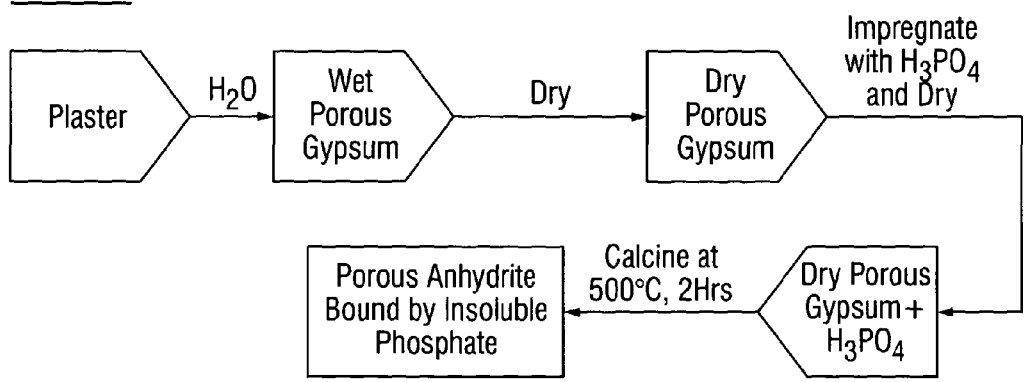
Figure 7:
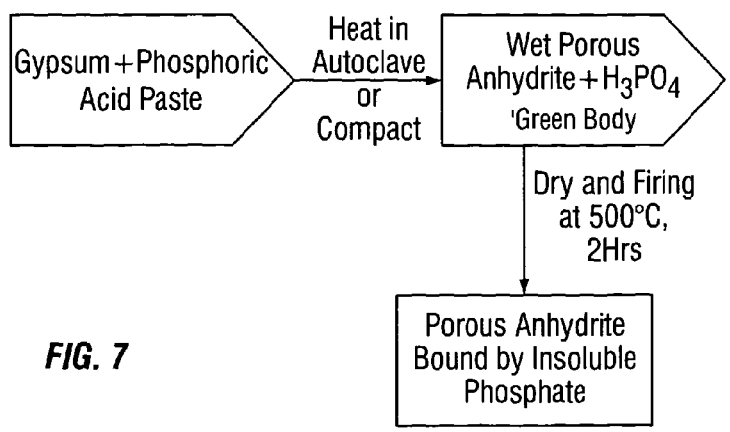

FIGS. 3 to 6 are graphs showing, respectively, properties of bodies according to the invention plotted respectively against ordinates of compressive peak stresses in MPa and abscissae of density in kg/m$^3$; and FIG. 7 shows schematically three schemes for making bodies according to the invention. Of these, Scheme 1 is least preferred because (as indicated above) it is less preferred to calcine the calcium sulphate before impregnating with phosphate ions.

Figure 3:
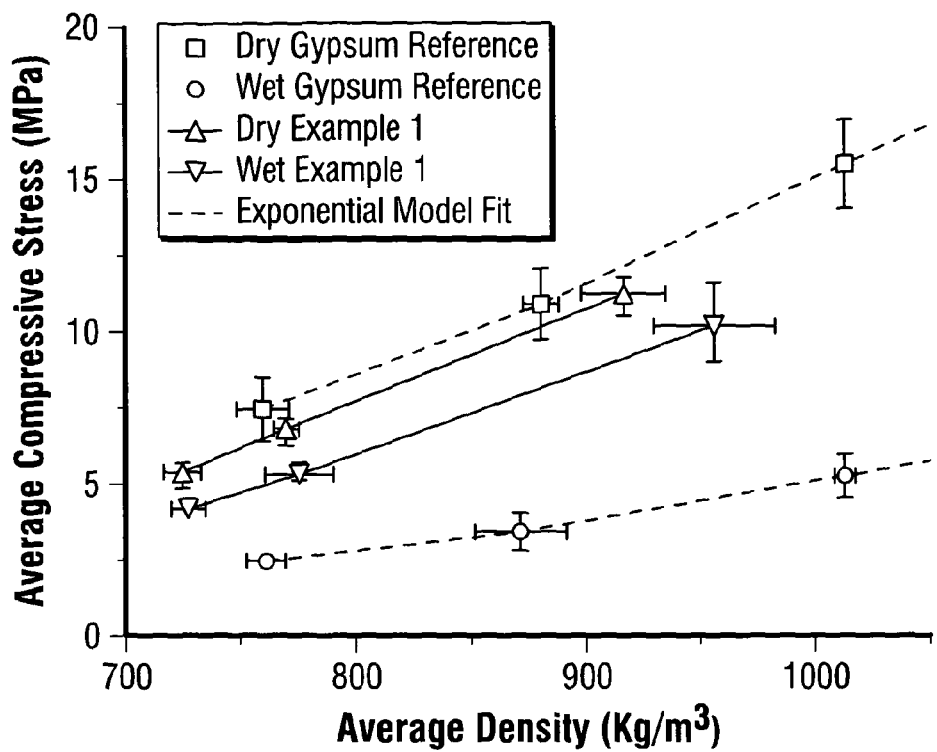
Figure 4:
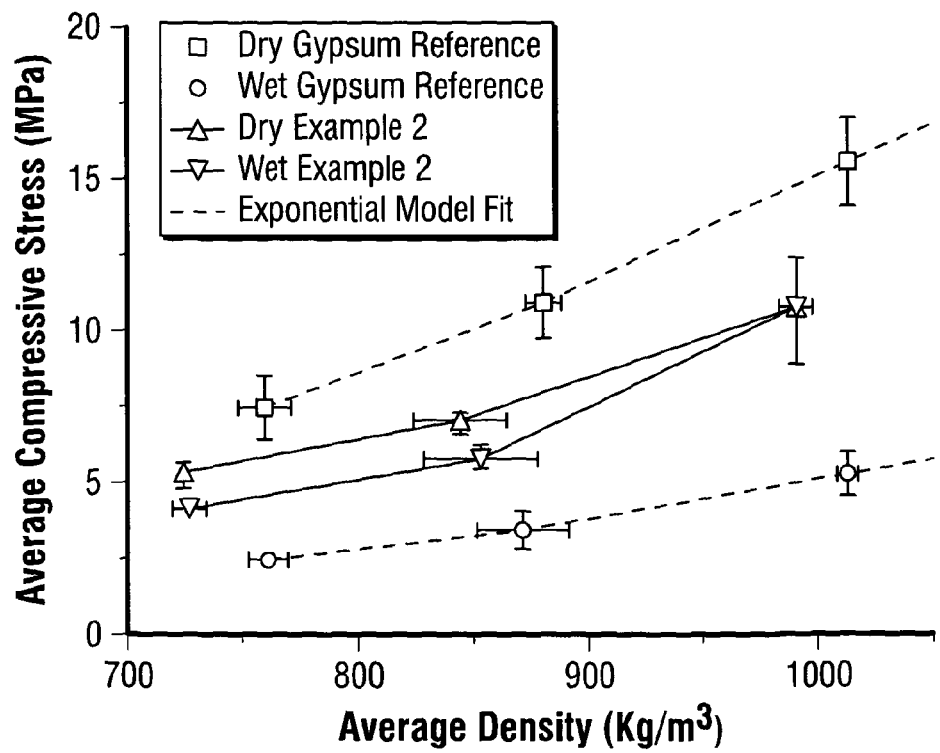

In FIGS. 3 and 4, the error bars shown correspond to one unit of standard deviation.

Figure 1:
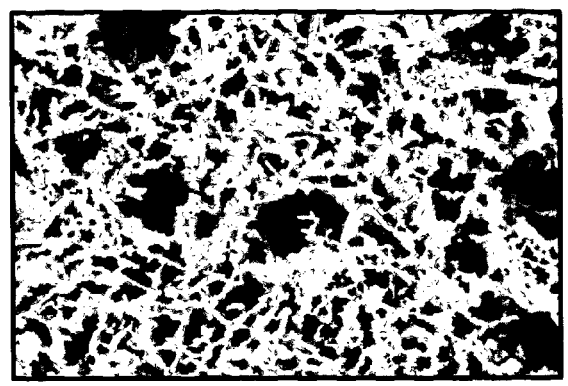
FIG. 1 shows a scanning electron micrograph of a slice of a first body according to the invention at 2500× magnification.
Figure 2A:
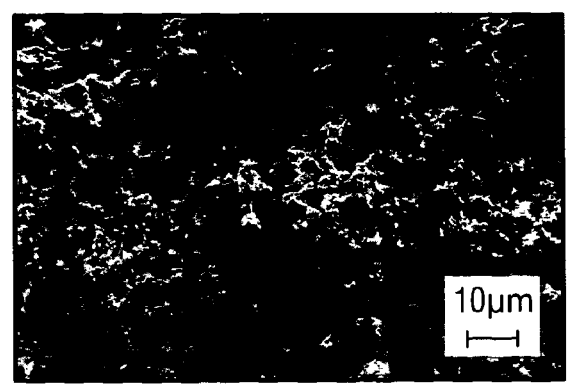
FIGS. 2a and 2b show a scanning electron micrograph of a slice of a second body according to the invention at respective magnifications of 1000× and 10,000×.
Figure 2B:
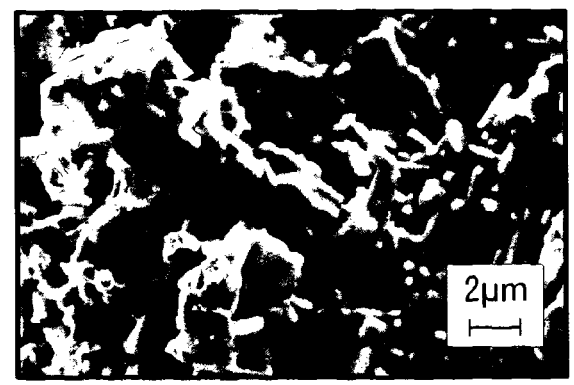

FIG. 1 shows a micrograph of a body produced according to scheme 1 of FIG. 7, using 5M orthophosphoric acid and FIGS. 2a and 2b show micrographs of a body produced according to scheme 2 of FIG. 7, using 7.5M orthophosphoric acid. (as described in more detail in the following Example 1).

The following worked examples are given by way of illustration only.

EXAMPLE 1

Saint-Gobain formula alpha plaster weighing 100 g was mixed by hand for one minute with 100 g of deionised water (giving a water:plaster ratio of 1:1) and then poured into a silicone rubber mould. A quantity of cylinders each measuring 12 mm (D)×24 mm (H) was cast in a single batch. Hydration was allowed for one hour before the batch of cylinders was dried at 40° C. for 12 to18 hours.

Orthophosphoric acid was made up at respective concentrations of 2.5M, 5M and 7.5M and impregnated into the porous structure of the gypsum cylinders under vacuum (this being an example of the process illustrated in Scheme 2 of FIG. 7 of the accompanying drawings).

The samples were dried at 40° C. overnight again before calcination in a furnace at 500° C. with a heating ramp of 5° C. min$^{-1}$ and 2 hour holding period. After cooling they were transferred to an oven at 40° C. There were 3 cylinders tested for each condition being evaluated.

The two testing conditions were "dry"; namely, out of the 40° C. oven; and wet; namely fully saturated with deionised water. Compressive strength testing was done using a Zwick universal testing machine at a crosshead speed of 2 millimeters per minute. Peak load was determined after the relevant sample load reduced 50% from its peak value.

The results are shown in FIG. 3 and indicate that the compressive strength of the wet body does not differ significantly from that of the dry body.

A micrograph of one of the cylinders, using 5M phosphoric acid, is shown in FIG. 1; this micrograph shows how the matrix is continuous like a ceramic, rather than discontinuous like re-hydrated gypsum. (For gypsum, the connections between crystals are water-sensitive, whereas for the body according to the invention the binder between the anhydrite crystals are insoluble and amorphous.) Similar results are shown for a different embodiment in FIGS. 2a and 2b.

EXAMPLE 2

Example 1 was repeated apart from the following changes: Gypsum cylinders were made with varying densities/porosities by varying the water:plaster ratio between 0.6 and 1. The same concentration of phosphoric acid impregnated each time was 2.5M.

The results are shown in FIG. 4 and indicate that the compressive strength of the wet body does not differ significantly from that of the dry body.

EXAMPLE 3

10 g of gypsum powder (analytical grade calcium sulphate dihydrate from Fisher Scientific) was mixed with 5 ml of orthophosphoric acid at respective concentrations of 2.5M, 5M and 10M mixed for one minute using a glass pestle and mortar. The resulting paste was poured into 200 mm (H)×10 mm (D) hand Teflon cylinder moulds with capped bottoms, and levelled, The moulds were placed in sealed "Parr" type sealed autoclaves having a 20 ml internal diameter Teflon liner.

The moulds were heated for 30 minutes in a forced convection oven at 250° C., and then cooled. The resulting green bodies were de-moulded and dried overnight at 40° C. before calcining and testing as described above in Example 1. This is an example of the process illustrated in Scheme 3 of FIG. 7 of the accompanying drawings).

The results are shown in FIG. 5 and indicate that the compressive strength of the wet body does not differ significantly from that of the dry body.

EXAMPLE 4

Example 1 was repeated apart from the following changes: A 40% (by weight) solution of aluminium phosphate having an $Al^{3+:}$ to $H_3PO_4$ molar ratio 0.33 to 1 was used as the impregnating solution.

The results of the above Examples 1 to 4 are further summarised in the following Table.

| Example | Water:plaster ratio | $H_3PO_4$ conc. (M) | $Al^{3+}$ conc. (M) | Density (kg/m³) | Equivalent wet gypsum reference compressive strength (MPa) | Wet compressive strength (MPa) | Improvement (%) |
|---|---|---|---|---|---|---|---|
| 1 | 1 | 7.5 | 0 | 956.8 | 4.39 | 10.26 | 134 |
| 1 | 1 | 5 | 0 | 776.1 | 2.69 | 5.39 | 100 |
| 1/2 | 1 | 2.5 | 0 | 727.2 | 2.36 | 4.26 | 80 |
| 2 | 0.8 | 2.5 | 0 | 853.5 | 3.32 | 5.87 | 77 |
| 2 | 0.6 | 2.5 | 0 | 990.1 | 4.80 | 10.90 | 127 |
| 3 | 0.5 | 2.5 | 0 | 857.6 | 3.36 | 2.52 | −25 |
| 3 | 0.5 | 5.0 | 0 | 961.5 | 4.44 | 11.77 | 165 |
| 3 | 0.5 | 10.0 | 0 | 1036.1 | 5.44 | 15.27 | 181 |
| 4 | 1 | 3.75 | 1.25 | 991.3 | 4.62 | 13.63 | 183 |

EXAMPLE 5

Gypsum cylinders were cast using the same method as described in Example 1 apart from the following differences:

Example 5.1 20 wt % fine alumina was dry blended into the plaster before setting with water.

Example 5.2 20 wt % aluminium hydroxide was dry blended into the plaster before setting with water.

Both bodies were impregnated with 5M phosphoric acid and calcined as described in Example 1.

Each sample (weighing <3 g) was tested by pre-weighing and immersing in 100 ml of de-ionised water for 4 hours. After removal, the sample was placed into a 40° C. forced convection oven and dried for approximately 12 hours. Each sample was re-weighed and immersed in fresh de-ionised water. This process was repeated for 3 immersion cycles.

EXAMPLE 6

A sample made according to Example 3 was used as Example 6.1 (for comparison) with a phosphoric acid concentration of 5M. Example 6.2 followed the same procedure except that fine alumina was dry blended into the gypsum powder before adding the phosphoric acid. The amount added was calculated to give a $Al^{3+}:H_3PO_4$ molar ratio of 0.33. Testing was performed in the same manner as described in Example 5.

The mass changes as calculated from the difference in weight of each of the dried samples of Examples 5 and 6 between immersion cycles are shown in accompanying FIG. 6. These results shows that the presence of aluminium increases the durability of the calcium sulphate and its resistance to re-wetting

The invention claimed is:

1. A water-resistant calcium sulphate-based body, which comprises a matrix of crystalline calcium sulphate anhydrite, crystals of said matrix being connected to one another by water-resistant phosphate bonding zones.

2. A body according to claim 1, wherein said bonding zones consist essentially of non-crystalline phosphate.

3. A body according to claim 1, wherein said bonding zones comprise anhydrous aluminophosphate.

4. A method of producing a water-resistant calcium sulphate based body, in which method (a) a porous calcium sulphate body is impregnated with a source of phosphate ions, and then (b) the impregnated body is calcined to produce a body comprising porous crystalline calcium sulphate anhydrite bonded by water-resistant phosphate.

5. A method of producing a water-resistant calcium sulphate based body, in which method (a) a paste comprising calcium sulphate and a source of phosphate ions is heated or compressed to form a green body; and then (b) the green body is calcined, whereby the resultant calcined body comprises porous crystalline calcium sulphate anhydrite bonded by water-resistant phosphate.

6. A method according to claim 4, wherein said source of phosphate ions comprises orthophosphoric acid and/or pyrophosphoric acid, or a salt thereof.

7. A method according to claim 6, wherein said salt is an aluminium salt.

8. A method according to claim 5, wherein said source of phosphate ions includes aluminium ions.

9. A method according to claim 5, wherein said source of phosphate ions comprises orthophosphoric acid and/or pyrophosphoric acid, or a salt thereof.

* * * * *